April 22, 1958  G. R. ROESCH  2,831,366
PAWL MECHANISM FOR HAND BRAKE LEVERS
Filed Dec. 15, 1954
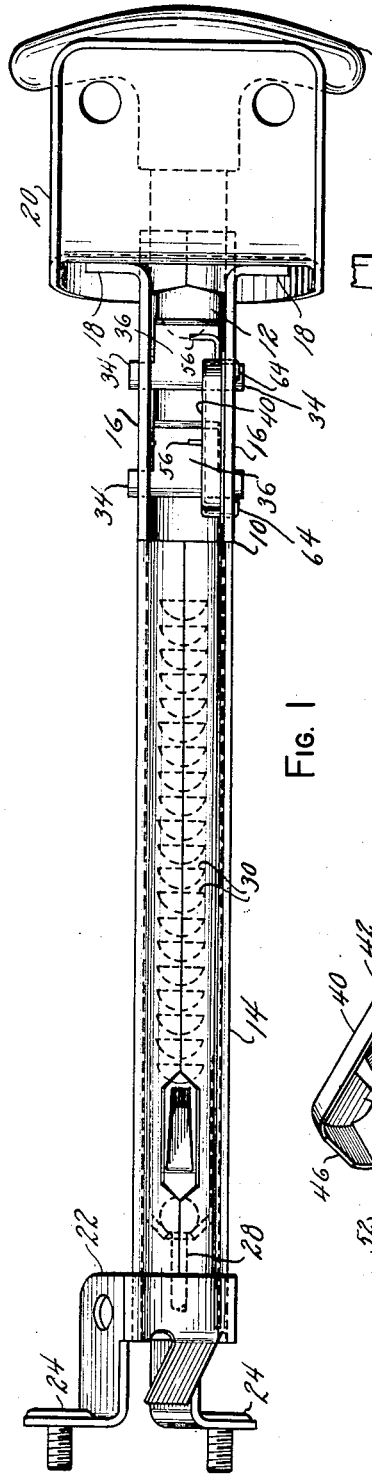
Fig. 1
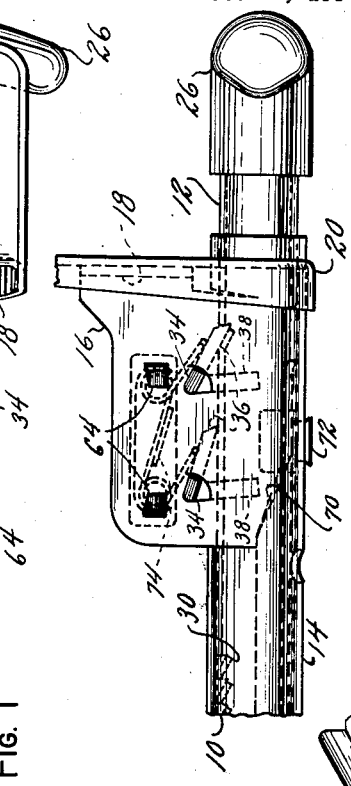
Fig. 2
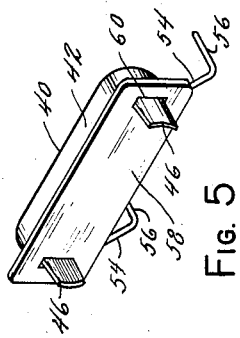
Fig. 5
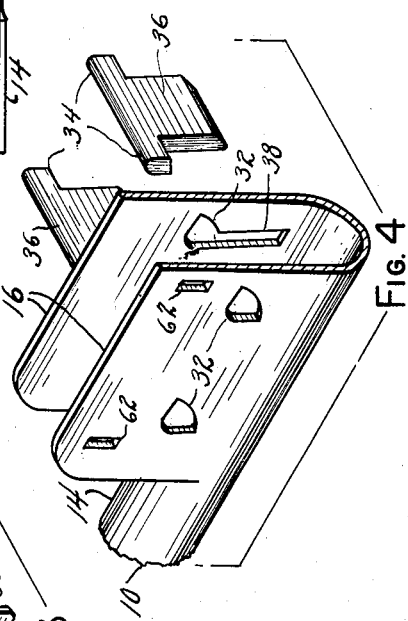
Fig. 3
Fig. 4
George R. Roesch
INVENTOR.
BY
Wm. C. Ballard
ATTORNEY.

United States Patent Office 2,831,366
Patented Apr. 22, 1958

2,831,366

PAWL MECHANISM FOR HAND BRAKE LEVERS

George R. Roesch, Toledo, Ohio, assignor to The Rush Stamping Company, Toledo, Ohio, a corporation of Ohio Application December 15, 1954, Serial No. 475,468

9 Claims. (Cl. 74—503)

This invention relates to brake control mechanisms.

An object of this invention is to provide a novel straight line pull type of brake control operating the emergency or parking brake.

Another object of this invention is to provide a straight line pull type brake control formed primarily from sheet metal stampings.

Another object of this invention is to provide a straight line pull type of brake control incorporating a rack and pawl mechanism therein of novel and improved construction.

Another object of this invention is to provide a straight line pull type of brake control incorporating therein a novel and improved rack and pawl mechanism, particularly the assembly thereof and the method of effecting such assembly.

Another object of this invention is to provide a shielded rack and pawl assembly for the movable parts incorporated within the mechanism herein disclosed.

And another object of this invention is to provide a novel rack and pawl assembly of maintained positive action and of increased economy of production.

Other objects and advantages of this invention relating to the arrangement, operation and functions of the related elements of the structure, to various details of construction, to combination of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a plan view of the brake control mechanism herein disclosed, showing features of the invention;

Fig. 2 is a partial side elevation of the mechanism of Fig. 1;

Fig. 3 is an exploded view of the spring assembly incorporated in the rack and pawl control portion of the mechanism;

Fig. 4 is an exploded view of the pawls and their mounting, illustrating the method of assembly; and Fig. 5 is a perspective view of an assembled spring unit ready for assembly within a complete brake operating mechanism.

The mechanism herein includes two primary or major parts, a guide tube 10 and a slide bar 12 reciprocably and rockably mounted therein. The tubular guide 10 is formed from a sheet metal stamping and as finished includes the guide or mounting extent 14 and a pair of opposing flanges 16 outwardly extending therefrom. These flanges 16 are in turn provided with oppositely extending ears 18 which are welded or otherwise attached to a suitable bracket 20 for mounting one end of the guide 10 in its predetermined position within a motor vehicle. This bracket 20 is usually mounted on the lower edge of the motor vehicle's dash board. The opposite or remote end of the guide 10 is attached to a suitable bracket 22 in turn fixed to the bulkhead of the motor vehicle by bolts 24 or other appropriate fastening elements. There is thus provided a fixed tubular guide as the foundation piece of the mechanism herein.

The slide bar 12 is mounted within the guide to be reciprocably and rockably moved therein as controlled by handle 26 affixed to the end of said bar against the bracket 20 while the opposite end is fashioned to be attached to a brake operating cable 28.

Operable between the slide and guide is a ratchet and pawl mechanism which is the prime subject matter of this application. The slide bar 12 is a sheet metal stamping formed into a tube and provided with a longitudinal series of aligned teeth 30 pressed thereinto in the fabrication of the stamping.

Each flange 16 is provided with a pair of apertures 32 therethrough in alignment with similar apertures in the opposite flange, thus forming pairs of bearings to receive the laterally extending arms 34 of T-shaped pawls 36.

The apertures 32 in one of the flanges 16 (Fig. 4) have slots 38 extending outwardly therefrom, which slots 38 are of sufficient dimensions to permit the pawls 36 to pass therethrough. Thus, in the assembly of the mechanism herein, the pawls 36 may be passed through the slots 38 with one of the pawl arms 34 engaging a bearing 32 in the opposite flange. The space between the flanges 16 is sufficient to permit the entire wedge portion of the pawl to be housed therein. With one arm 34 in an aperture 32 of one flange, the other arm 34 of the pawl will nest within the opposing aperture 32, thus mounting the pawl between the flanges 16. When the pawl has been inserted between the flanges 16, the mechanism may be inverted and the pawls will swing by gravity clear of the tubular extent 14. The slide bar 12 may then be inserted into the guide 10, and the mechanism again reversed, and the pawls will not only drop by gravity into ratchet engaging position, but will be locked in the bearings 32.

In the initial assembly of the slide bar into the guide, the pawls being out of operative position, the handle can be moved into the guide adjacent to bracket 22. This permits the assembly of the cable 28 with the slide bar. The bar is then partially withdrawn from the guide with the pawls in operative position, and one of the teeth 30 of the ratchet portion prevents further unnecessary inward movement of the slide. The pawls 36 are spaced in their mounting so that but one pawl engages the ratchet in locking position at any one time. The teeth in turn are spaced so that the slide bar may be locked in half increments of ratchet movement, thereby imparting a fine or nicely locking coaction between the guide and slide.

In operation herein it is desirable to have the pawls resiliently held against the ratchet at all times and without any looseness therebetween. To this end, spring means are employed to normally urge the pawls against the ratchet.

Heretofore, in similar structures, springs have been employed to operate against the pawls, but in operation the springs have become canted or shifted and lose their proper biasing action. It is a purpose of the construction herein to correct this defect.

To this end there is herein shown a sheet metal cup-shaped element 40 including a rim 42 about plate-like portion 44. Outwardly extending from the rim 42 is a pair of opposing downwardly tapering tongues 46 and a portion of the rim 42 between the tongues 46 has a cut-away extent 48. A double loop sear-type wire spring element 50 is nested within the element 40, so that the spring loops or coils 52 are seated against the plate-like portion 44. Outwardly extending from each loop 52 is a spring finger 54 terminating in an offset 56. With the spring element nested within the element 40, such assembly is locked into a unit by plate 58. This plate 58 is provided with a pair of rectangular apertures 60 therethrough. The apertures 60 freely receive the outer ends of the tongues 46, but the dimensions of the aperture 60 are slightly smaller than the maximum width of the tongues 46 adjacent the rim 42. Thus, a press fit assembly is required to force the plate 58 against the rim 42, but such press fit operating against the variation in size between the tongue 46 and aperture 60 locks the plate 58 against the element 40 to form a sealed housing unit, with the spring coils 52 contained therein and the spring fingers 54, 56 extending outwardly therefrom through the cut-away portion 48. There is thus provided an independent spring unit in which the coils of the spring are sealed within a confining housing, preventing the spring from enlarging in the loop areas or from being canted from the position in which it is assembled within the brake operating mechanism.

One of the flanges 16 of the guide 10 is provided with a pair of rectangular apertures 62 therethrough which may receive the tongues 46 protruding from the plate 58. The spring unit may be inserted between the flanges 16 and the tongues 46 directed to extend through the apertures 62. The outer ends of the tongues are then bent over against the outer face of the flange 16 to form assembly locks 64. Thus the spring unit is firmly attached to the inner face of its respective mounting flange 16 with the spring fingers 56 engaging the pawls 36 to normally urge them against the ratchet 30.

The slide bar 12 is provided with a desired camming portion 70 and the cooperating guide mounts shoe 72 to program movements of the slide bar within the guide. There is herein provided a spring assembly for operation within the pawl and ratchet combination which is permanently held in a fixed position and defeats any tendency for the spring to lose its effectiveness through operation or displacement.

By the preassembly of the spring and its housing, there is provided a complete spring unit which may be easily and quickly inserted into the finished mechanism, and by merely turning over the tongue termini to lock the unit within the housing, there is no need of rivets, bolts or welding, including the use of the necessary tools for the handling thereof. The assembly is a quick and economical operation. The housing element 40 may be contoured to efficiently and securely house a spring member 50, which may assume various forms, as for example a lip 74 may be turned inwardly from the plate portion 44 to match the particular spring shape used in the assembly and to securely retain the same in its intended position. By the preassembly of the spring unit, a substantial saving is made in the overall cost of the unit, at the same time producing a more substantial mechanism.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and desired to secure by United States Letters Patent:

1. In a brake controlling mechanism of the class described, a tubular guide member having a pair of opposing flanges outwardly extending therefrom, a slide reciprocable and rockable in said guide, a ratchet on said slide, a pair of apertures through each flange providing two pairs of aligned bearings, a pair of pawls each including a pair of arms outwardly extending in opposite directions therefrom into said bearing, said pawls coacting with said ratchet, spring means including a pair of connected coils, each coil outwardly terminating in a spring arm in contact with one of said pawls and normally urging said pawls into ratchet engaging position, and a carrier for said spring coils embodying an elongated housing mounted in one of the opposing faces of said flanges, said carrier housing said coils and providing apertures to permit the arms to extend therethrough to engage said pawls.

2. In a brake controlling mechanism of the class described, a ratchet guide having a pair of opposing flanges outwardly extending therefrom, a slide reciprocable and rockable in said guide, a ratchet on said slide, a pawl swingably mounted by and between said flanges, a housing fastened to an opposing face of one of said flanges, said housing provided with an aperture therethrough, and a spring seated within said housing, said spring having a finger outwardly extending through said aperture to engage said pawl and normally urge the same toward ratchet engaging position.

3. The structure set forth in claim 2 wherein said pawl is a T-shaped element, the laterally extending arms thereof extending through said flanges to provide a pivotal mount for said pawl with the vertical arm engaging said ratchet.

4. The structure set forth in claim 2 wherein said housing is provided with an outwardly extending tongue projecting through one of said flanges and bent to lock said housing against said flange.

5. The structure set forth in claim 2 wherein said spring is a sear type spring embodying a loop seated within said housing and having a finger extension therefrom outward through said aperture in said housing.

6. In a brake operating mechanism of the class described, a tubular guide, means for mounting said guide in a predetermined position, said guide having a pair of flanges outwardly extending therefrom in spaced parallel planes, a slide mounted in said guide, a handle on said slide to reciprocate and rock said slide within the guide, said slide having a longitudinal series of aligned teeth thereon to provide a ratchet, two pairs of apertures in said flanges, one of said pairs providing an aligned pair of bearings, a pawl rockably mounted in said bearings, a housing on the inner face of one of said flanges having a tongue outwardly extending therefrom through one of the other flange apertures, said tongue being bent to abut the outer face of said flange and thereby fasten said housing to the flange, a spring including a loop seated within said housing and providing a finger extending therefrom beyond the housing to engage said pawl and normally urge said pawl into ratchet engaging position.

7. The housing set forth in claim 6 including a cup-shaped element having a rim provided with a pair of tongues outwardly extending from the rim of said element and provided with a cut-away portion between said tongues, a cover plate including apertures to receive said tongues to permit said plate to be seated against the rim to complete a housing having an outlet therefrom through said cut-away region.

8. In a brake operating mechanism including a ratchet and pawl, spring means for exerting pressure on said pawl including a housing unit, said unit including a cup-shaped element provided with a rim, a pair of tapered tongues outwardly extending from said rim, said rim having a cut-away portion between said tongues, a cover for said cup-shaped element comprising a plate aperture to allow said tongues to extend therethrough to allow said plate to engage said rim and complete a housing having an outlet therefrom formed by said cut-away portion of the rim, a wire spring embodying a coil nested within said housing and having a finger extension therefrom through said outlet, said brake mechanism having apertures therein to receive said tongues, whereby said tongues are bent thereabout to mount said housing in position to permit said spring finger extension to abut said pawl.

9. The structure set forth in claim 8 wherein said tongues are tapered, and the apertures in the cover plate are of less extent than the maximum width of said tapers, whereby the assembly therebetween is a press fit to lock said plate against the rim of the housing unit.

References Cited in the file of this patent

UNITED STATES PATENTS

| | | |
|---|---|---|
| 1,564,174 | Hayes | Dec. 1, 1925 |
| 2,429,224 | Fergueson et al. | Oct. 21, 1947 |
| 2,429,383 | Arens | Oct. 21, 1947 |
| 2,543,510 | Sandberg | Feb. 27, 1951 |
| 2,607,239 | Weber | Aug. 19, 1952 |
| 2,631,470 | Sandberg | Mar. 17, 1953 |
| 2,664,014 | Feemster et al. | Dec. 29, 1953 |
| 2,755,500 | Floehr | July 24, 1956 |

FOREIGN PATENTS

| | | |
|---|---|---|
| 804,515 | Germany | Apr. 26, 1951 |